US008774656B2

(12) United States Patent
Sato et al.

(10) Patent No.: US 8,774,656 B2
(45) Date of Patent: Jul. 8, 2014

(54) IMAGE POSITION DETECTOR AND IMAGE FORMING DEVICE

(75) Inventors: Masahiko Sato, Sagamihara (JP); Toshio Yanata, Ebina (JP); Masafumi Hashiguchi, Yokohama (JP); Masataka Akaishi, Ebina (JP); Sohichiroh Naka, Zama (JP); Norifumi Yamamoto, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 245 days.

(21) Appl. No.: 13/474,890

(22) Filed: May 18, 2012

(65) Prior Publication Data
US 2012/0298845 A1 Nov. 29, 2012

(30) Foreign Application Priority Data

May 23, 2011 (JP) .................................. 2011-114711
Mar. 15, 2012 (JP) .................................. 2012-058082

(51) Int. Cl.
  *G01J 1/42* (2006.01)
(52) U.S. Cl.
  USPC ........................................ 399/49; 250/559.29
(58) Field of Classification Search
  USPC ........................................ 250/559.29; 399/49
  See application file for complete search history.

(56) References Cited

U.S. PATENT DOCUMENTS

| 7,715,770 | B2* | 5/2010 | Kinoshita | 399/301 |
| 2006/0013603 | A1 | 1/2006 | Matsuyama | |
| 2010/0232817 | A1 | 9/2010 | Miyadera et al. | |
| 2011/0217055 | A1* | 9/2011 | Takehara et al. | 399/27 |
| 2011/0222892 | A1 | 9/2011 | Hashiguchi et al. | |
| 2012/0288289 | A1* | 11/2012 | Kinoshita | 399/39 |
| 2013/0164006 | A1* | 6/2013 | Suzuki | 399/49 |

FOREIGN PATENT DOCUMENTS

| JP | 2004-117385 | 4/2004 |
| JP | 2006-30712 | 2/2006 |
| JP | 2010-217325 | 9/2010 |

* cited by examiner

*Primary Examiner* — Tony Ko
(74) *Attorney, Agent, or Firm* — Cooper & Dunham LLP

(57) ABSTRACT

An image position detector includes a light emitting element to emit light to an image on an image carrier, a first light receiving element to receive a specular reflection of light from a surface of the image carrier and output a first light receiving signal, and a second light receiving element to receive a diffuse reflection of light from a surface of the image and output a second light receiving signal. The image position detector is configured to find the end position of the image according to a multiplied value obtained by multiplying values of the first and second light receiving signals by a constant coefficient.

12 Claims, 17 Drawing Sheets

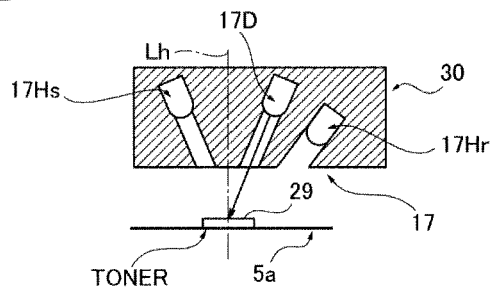
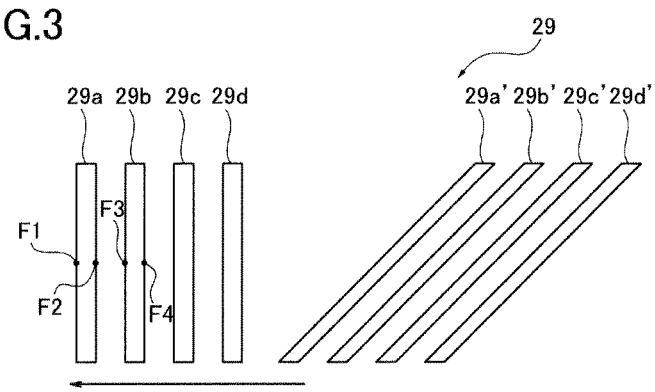
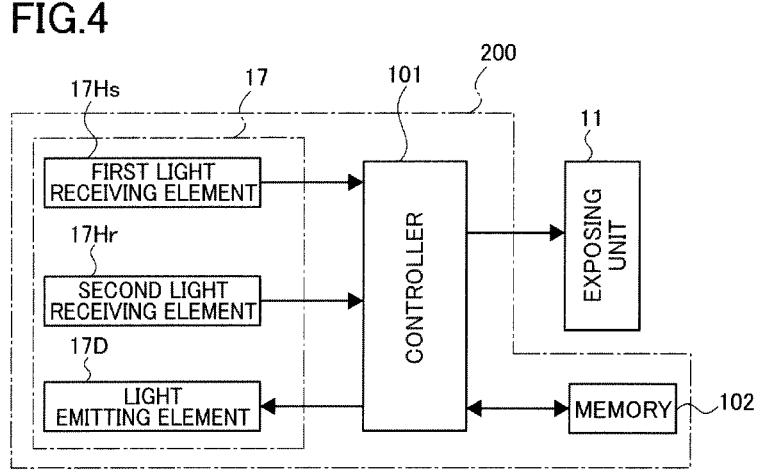

ORIENTATION CHARACTERISTIC

ORIENTATION CHARACTERISTIC

NO OUTPUT DIFFERENCE IN BLACK AND COLOR

IMAGE POSITION DETECTOR AND IMAGE FORMING DEVICE

CROSS REFERENCE TO RELATED APPLICATION

The present application is based on and claims priority from Japanese Patent Application No. 2011-114711, filed on May 23, 2011 and No. 2012-58082, filed on Mar. 15, 2012, the disclosure of which is hereby incorporated by reference in its entirety.

BACKGROUND OF THE INVENTION

1. Field of the Invention

The present invention relates to an image position detector to detect the end position of an image on an image carrier and an image forming device incorporating such an image position detector.

2. Description of the Prior Art

Japanese Patent Application Publication No. 2010-217325 discloses an image forming device to form a position correcting pattern on a paper transfer belt and read this pattern with a sensor to correct an image write timing.

Specifically, such an image forming device forms position correcting patterns for a reference color and for a primary color on the transfer belt and irradiates the patterns with infrared rays with a wavelength having a peak of spectral sensitivity characteristic relative to the primary color pattern, to detect intensity of reflection from the patterns. Then, it sets a threshold for the reflection intensity to find the center of each pattern, calculate a positional shift amount from the centers between the two colors and correct a positional shift on the basis of the calculated shift amount. Further, this device is configured not to generate diffuse rays which would otherwise affect the position detection.

SUMMARY OF THE INVENTION

An object of the present invention is to provide an image position detector configured to detect the end position of an image, free from an influence of diffuse rays as well as an image forming device incorporating such an image position detector.

According to one aspect of the present invention, an image position detector to detect an end position of an image on an image carrier, comprising a light emitting element to emit light to the image on the image carrier, a first light receiving element to receive a specular reflection of light from a surface of the image carrier and output a first light receiving signal, and a second light receiving element to receive a diffuse reflection of light from a surface of the image and output a second light receiving signal, wherein the image position detector is configured to find the end position of the image according to a multiplied value obtained by multiplying values of the first and second light receiving signals by a constant coefficient.

BRIEF DESCRIPTION OF THE DRAWINGS

Features, embodiments, and advantages of the present invention will become apparent from the following detailed description with reference to the accompanying drawings:

FIG. 2B shows the structure of a toner mark sensor;

FIG. 3 shows correction patterns;

FIG. 4 is a block diagram of a control system of the image forming device in FIG. 1;

DESCRIPTION OF THE PREFERRED EMBODIMENT

Hereinafter, one embodiment of the present invention will be described in detail with reference to the accompanying drawings. Wherever possible, the same reference numbers will be used throughout the drawings to refer to the same or like parts.

First Embodiment

Figure 1:
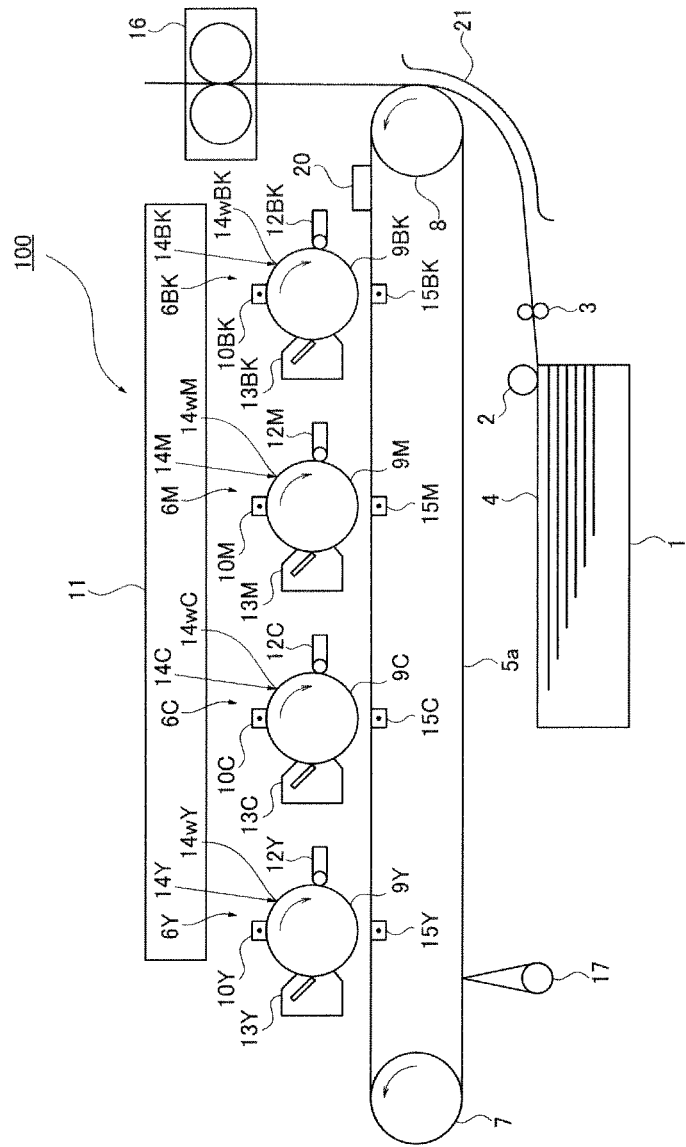
FIG. 1 schematically shows the structure of an image forming device according to one embodiment of the present invention.

FIG. 1 shows a tandem-tram, indirect transfer type image forming device 100 which includes a paper feed tray 1, an exposing unit 11, an imaging unit 6 (6Y, 6C, 6M, 6BK), an intermediate transfer belt 5a as an image carrier, a transfer unit 15 (15Y, 15C, 15M, 15BK), a fusing unit 16, and a toner mark sensor 17.

The image forming device 100 creates full color images on a paper by primarily transferring an image onto the intermediate transfer belt 5a and secondarily transferring a four-color superimposed image onto the paper collectively.

The imaging unit 6 includes four-color electrophotographic processing units 6BK (black), 6M (magenta), 6C (cyan), 6Y (yellow) arranged in order in the rotation direction of the intermediate transfer belt 5a, to form black, magenta, cyan, yellow toner images, respectively. The four processing units are configured same except for the color of images formed. In the following these units are collectively described irrespective of the colors without the added codes, Bk, M, C, Y.

The intermediate transfer belt 5a is extended between a drive roller 7 and a driven roller 8. The drive roller 7 is driven by a not-shown motor to move counterclockwise as indicated by an arrow in FIG. 1.

A not-shown secondary transfer roller is disposed near the driven roller 8 around which the intermediate transfer belt 5a is wrapped for secondary transfer. A paper from the paper feed tray 1 is delivered by a feed roller 2 and a separation roller 3 to a secondary transfer position 21. A cleaning unit 20 is also provided at downstream of the secondary transfer position 21.

The imaging unit 6 includes photoreceptors 9, charging units 10 disposed on the outer circumferences of the photoreceptors 9, develop units 12, transfer units 15, photoreceptor cleaners 13, and not-shown neutralizers. It also includes exposure portions 14w between the charging units 10 and the develop units 12 irradiated with laser beams 14 from the exposing unit 11.

The exposing unit 11 emits the laser beams 14 for the image colors to the exposing units 14w of the photoreceptors 9 of the imaging unit 6. The transfer units 15 are disposed to face the photoreceptors 9 via the intermediate transfer belt 5a.

Figure 2A:
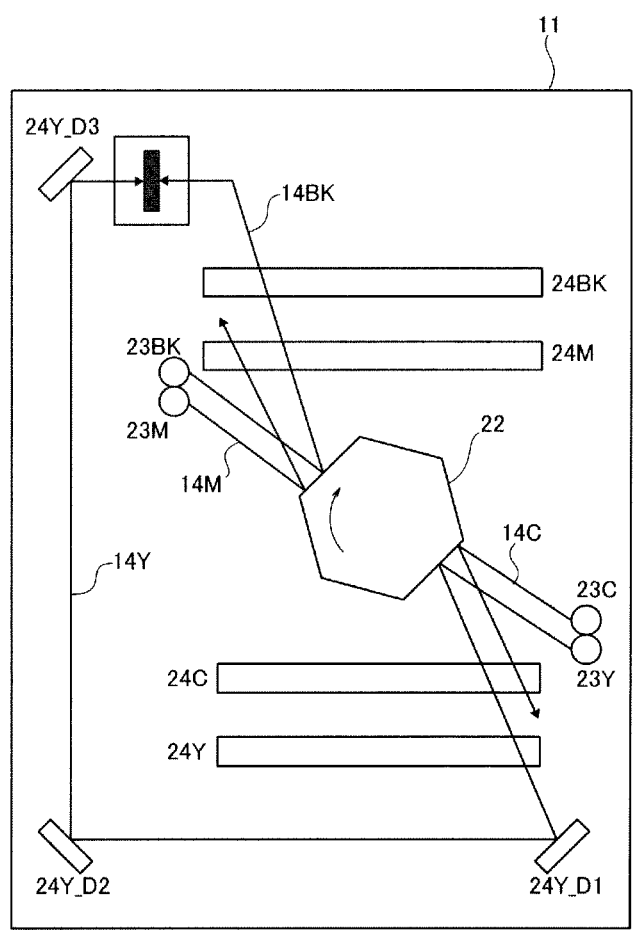
FIG. 2A schematically shows the inner structure of an exposing unit in FIG. 1.

The exposing unit 11 in FIG. 2A includes laser diodes (LD) 23Bk, 23M, 23C, 23Y to emit laser beams 14Bk, 14M, 14C, 14Y, a polygon mirror 22, and optical systems 24Bk, 24M, 24C, 24Y. The laser beams from the laser diodes 23Bk, 23M, 23C, 23Y are reflected by the polygon mirror 22 to the optical systems 24Bk, 24M, 24C, 24Y to adjust their optical paths and scan the surfaces of the photoreceptors 9Bk, 9M, 9C, 9Y.

The polygon mirror 22 is hexahedral and each face thereof scans with each of the laser beams by one line in main scan direction.

The laser beams 14BK, 14M and the laser beams 14C, 14Y are reflected by the opposite faces of the polygon mirror 22, respectively to be able to expose the four photoreceptors 9 concurrently. The laser diodes 23 are each comprised of an fθ lens to align the reflected beams at the same interval and a deflection mirror.

A toner mark (TM) sensor 17 in FIG. 2B is a reflective type optical sensor and includes a light emitting element 17D as an infrared light-emitting diode to emit infrared light to the intermediate transfer belt 5a, a first light receiving element 17Hs as a phototransistor to receive specular reflection of light from the intermediate transfer belt 5a, and a second light receiving element 17Hr as a phototransistor to receive diffuse reflection of light from a color pattern image on the intermediate transfer belt 5a.

The light emitting element 17D and the first and second light receiving elements 17Hs and 17Hr are supported by a case 30 in the main scan direction (horizontally in FIG. 2B) orthogonal to a paper delivery direction. The light emitting element 17D and the first light receiving element 17Hs are inclined in opposite directions at the same angle relative to a vertical line Lh of the intermediate transfer belt 5a. The second light receiving element 17Hr is disposed on the right side of the light emitting element 17D and inclined at a larger angle than the light emitting element 17D.

A shown in FIG. 3, in order to calculate necessary position shift amount data, a correction pattern for position shift 29 or color pattern images are generated on the intermediate transfer belt 5a and read by the TM sensor 17 to detect position shift amounts among the four colors. After the detection, the correction patterns 29 are removed from the intermediate transfer belt 5a by the cleaning unit 20.

The correction pattern 29 in FIG. 3 includes cyan, black, yellow, magenta pattern images 29a, 29b, 29c, 29d in rectangular form extending in the main scan direction and pattern images 29a', 29b', 29c', 29d' inclined relative to the main scan direction.

The correction pattern 29 is moved leftward with the intermediate transfer belt 5a from the left side.

FIG. 4 shows the control system of the image forming device 100. It includes a controller (calculator) 101 to perform various controls or calculations for image generation according to a manipulation of a not-shown operation unit, and a memory 102 in which a later-described constant coefficient of 0.3 is stored. The controller 101 is configured to find the end positions and shift amounts of the pattern images 29a to 29d and 29a' to 29d' according to the light receiving signals of the first and second light receiving elements 17Hs, 17Hr, and control the exposing unit 11 in accordance with the shift amounts to correct image write timing.

An image position detector 200 is comprised of the light emitting element 17D, first and second light receiving elements 17Hs, 17Hr, controller 101, and memory 102.

Figure 5:
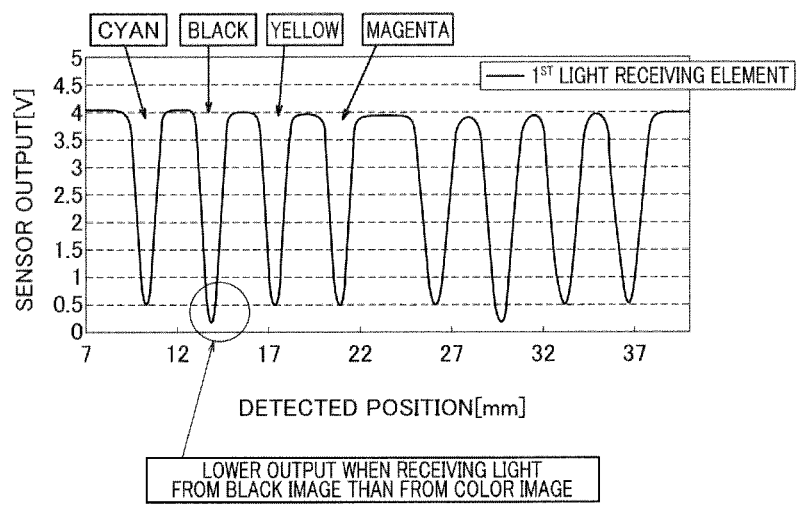
FIG. 5 is a graph showing the waveform of a light receiving signal of a first light receiving element of a toner mark sensor.

FIG. 5 shows the waveform of the output of the toner mark sensor 17 when the first light receiving element 17Hs in FIG. 2B receives light from the correction pattern 29 in FIG. 3.

The surface of the intermediate transfer belt 5a is glossy and has a several % reflection rate. The light emitting element 17D and first light receiving element 17Hs are placed to receive mirror reflection by the belt surface. Presence of toner on the optical path reduces the output of the first light receiving element 17Hs since toner particles tend to diffuse light, decreasing an amount of light incident on the first light receiving element 17Hs.

Further, a black toner does not cause diffuse reflection of light due to a low reflection rate even when the wavelength of light from the light emitting element 17D is in an infrared range. However, a color toner causes diffuse reflection of light due to a high reflection rate in the infrared range, and a low amount thereof reaches the light receiving element 17Hs.

Generally, the intermediate transfer belt 5a is set in a high gross level so that the output of the first light receiving element 17Hs when receiving light from the belt surface becomes higher than when receiving that from the color toner surface. Thereby, the toner position or image position can be detected from a decrease in the output of the first light receiving element 17Hs having received light from the color toner surface.

In FIG. 5 the second and sixth bottom peaks of the waveform with a greatly smaller value than the other portions correspond to the black toner portions. The light from the color toner contains diffuse reflection of light so that the output of the receiving element 17Hs increases.

The bottom peaks of the waveform in FIG. 5 indicate the output values of the first light receiving element 17Hs having detected cyan, black, yellow, magenta toner images in order.

Figure 6:
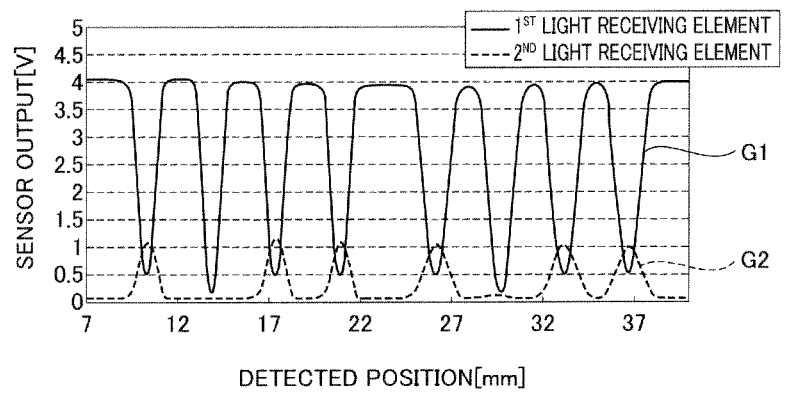
FIG. 6 is a graph showing the waveforms of light receiving signals of the first and second light receiving elements of the toner mark sensor.

FIG. 6 shows the waveforms G1, G2 of the outputs or first and second light receiving signals of the first and second light receiving elements 17Hs, 17Hr when detecting a toner image or the correction pattern 29, respectively.

Figure 7:
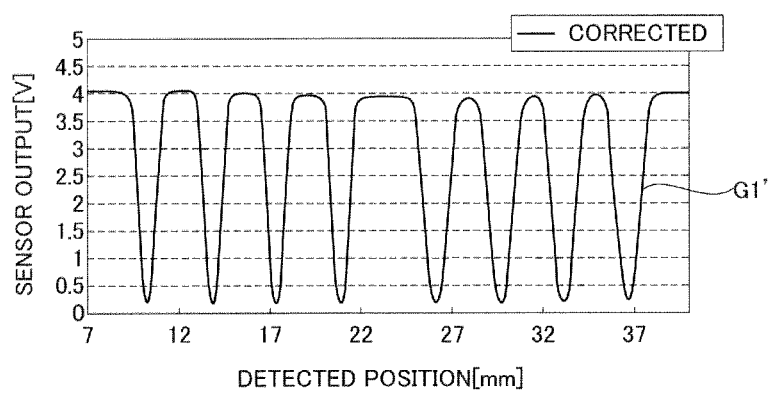
FIG. 7 is a graph showing the waveform of a corrected light receiving signal of the first light receiving element.

FIG. 7 shows the same corrected by a calculation of (output signal of first light receiving element 17Hs)−(output signal of second light receiving element 17Hr)*coefficient of 0.3. As seen in FIG. 7, the values of the output signals by the detection of the cyan, black, yellow, magenta toner images can be made coincident.

The position shift in an image is detected by obtaining the position of each color toner image on the basis of the position of a black toner image as a reference.

By the correction in FIG. 7, diffuse reflection of light components can be removed from the output of the first light receiving element 17Hs having received the light reflected by the color toner, thereby resulting in reducing a detection error.

Figure 8:
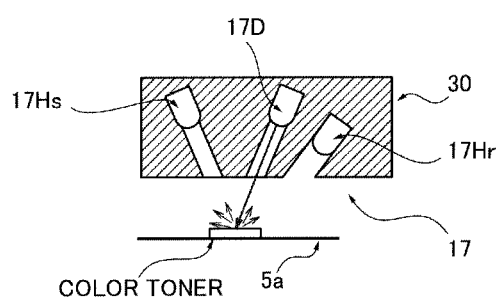
FIG. 8 shows the positional relation between the toner mark sensor and diffuse rays from a color toner.

The diffuse reflection of light by the color toner is thus scattered isotropically as shown in FIG. 8 and the intensity of received diffuse reflection of light is almost constant.

Therefore, the diffuse reflection of light at the same intensity travels to the first and second light receiving elements 17Hs, 17Hr. However, the amounts of light received by them are different depending on the diameters of not-shown apertures provided in front of the light receiving elements 17Hs, 17Hr, and the constants of amplifier circuits after the receipt of light are also different. Because of this, the output signal value of the first light receiving element 17Hs having received only the diffuse reflection of light is different from that of the second light receiving element 17Hr having received the diffuse reflection of light, and the former is a constant multiple α of the latter.

The constant multiple α can be found by measuring the output of an optical sensor on a diffuse paper or attaching a sufficient amount of toner onto the transfer belt of a real machine not to be affected by the belt. Herein, the following equations are satisfied.

$$VS=VSS+VSD$$

$$VD=VDD$$

where VS is an output signal or light receiving signal of the first light receiving element 17Hs, VD is an output signal of the second light receiving element 17Hr, VSS is an output signal of a specular reflection of light component among the output signal of the first light receiving element 17Hs, VSD is an output signal of a diffuse reflection of light component among the output signal of the first light receiving element 17Hs, and VDD is an output signal of a diffuse reflection of light component among the output signal of the second light receiving element 17Hr.

In the present embodiment the output signal VSS can be obtained by concurrently measuring the output signals VS and VD or calculating the constant multiple α. The end positions of correction pattern images are found according to the VSS to calculate a distance between the pattern images. Thus, it is made possible to reduce a detection error due to the diffuse reflection of light.

The equation for correcting the output signal or light receiving signal of the first light receiving element 17Hs is as follows:

$$VSS=VS-\alpha*VD$$

The constant multiple (α) is obtained by the following:

$$\alpha=VSD/VDD$$

On a diffuse paper is VSS zero so that the constant multiple will be:

$$\alpha=VS/VD.$$

Figure 9:
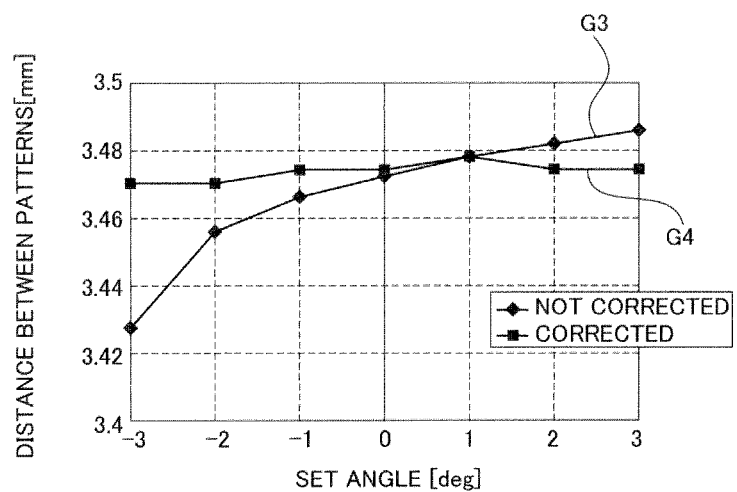
FIG. 9 is a graph showing the relation between a set angle of the first light receiving element and a distance between patterns with or without the correction of the light receiving signal.

FIG. 9 shows a line G3 indicating a distance between the correction pattern images read with the TM sensor 17 while changing a set angle (direction) of the first light receiving element 17Hs, a line G4 indicating the same when the output signal of the first light receiving element 17Hs is corrected by the above equation. In comparison with the line G3, the line G4 does not change along with a change in the set angle. At ±3 degree angle, the distance changes by 1.7% before the correction while it changes by 0.2% after the correction.

Figure 26:
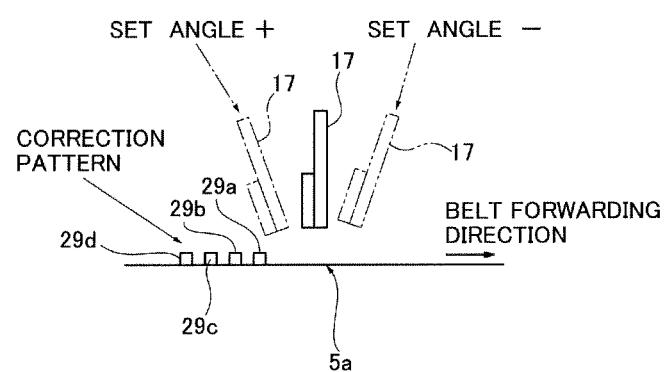
FIG. 26 shows the toner mark sensor at different set angles.

Note that the set angle is an angle of the first light receiving element 17Hs inclined rightward (−) or leftward (+) relative to the TM sensor 17 disposed vertically to the intermediate transfer belt 5a, as shown in FIG. 26.

Figure 10:
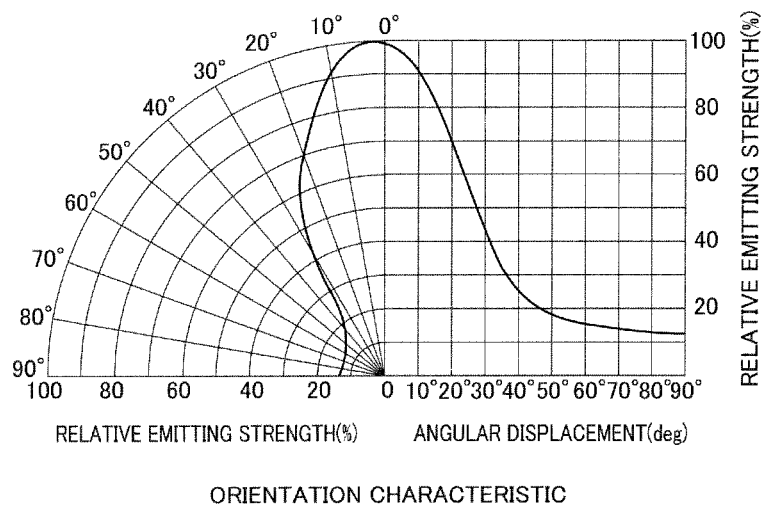
FIG. 10 is a graph showing the orientation characteristic of an infrared light-emitting diode.
Figure 11:
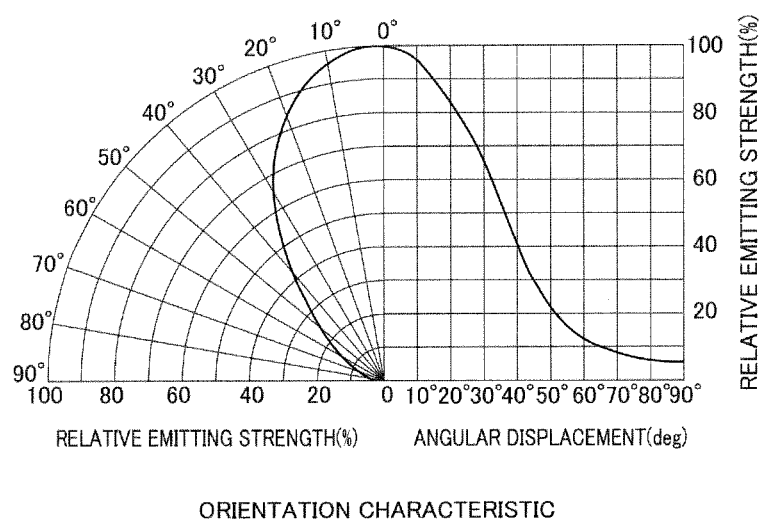
FIG. 11 is a graph showing the orientation characteristic of an infrared phototransistor.
Figure 12:
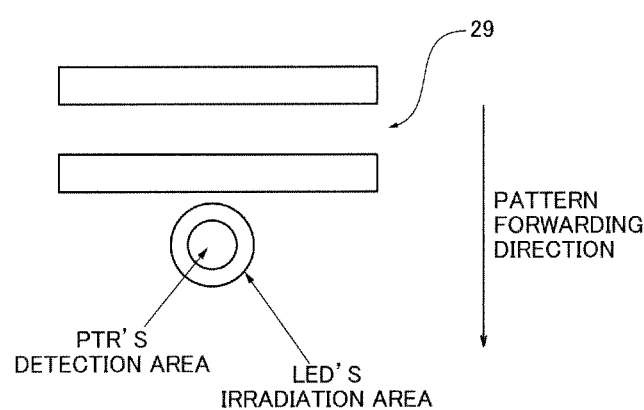
FIG. 12 shows the ideal positions of the irradiation area of the light emitting element and the detection area of the first light receiving element.
Figure 13:
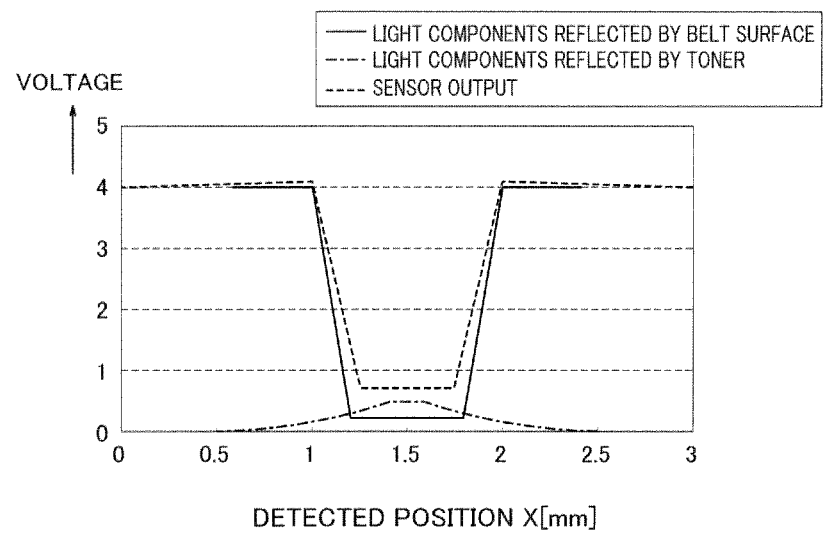
FIG. 13 is a graph showing the light components reflected by a belt surface and those reflected by a color toner when the patterns are ideally irradiated as shown in FIG. 12.

Next, the reason why the diffuse reflection of light components of the output signal of the first light receiving element 17Hs causes a detection error in reading the correction pattern 29 is described with reference to FIGS. 10-18. FIG. 10 shows the orientation characteristic of an infrared light-emitting diode, and FIG. 11 shows the orientation characteristic of a general infrared phototransistor. FIG. 12 shows the ideal positions of the irradiation area of the light emitting element 17D as LED and the detection area of the first light receiving element 17Hs as phototransistor PTR with their centers coincident with each other. FIG. 13 shows the specular reflection of light components by the surface of the intermediate transfer belt 5a and the diffuse reflection of light components by the color toner among the output signal of the first light receiving element Hs when the pattern 29 is ideally irradiated as shown in FIG. 12.

In the ideal positional relation in FIG. 12 the position at which the diffuse reflection of light from the color toner is maximal coincides with the center of a decrease in the specular reflection of light from the belt surface (around X=1.5 in FIG. 13). A black toner does not cause diffuse reflection of light.

Figure 14:
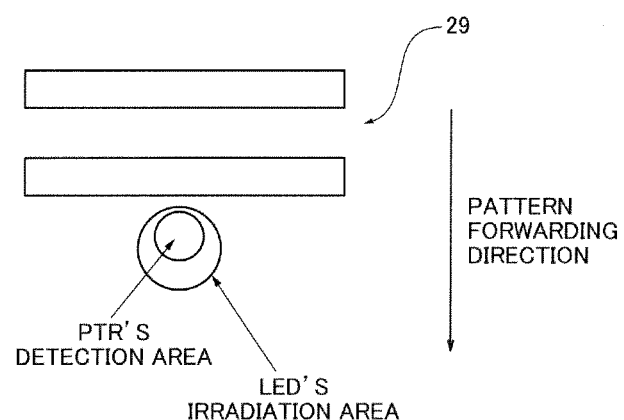
FIG. 14 shows the irradiation area of the light emitting element and the detection area of the first light receiving element with their centers shifted from each other.
Figure 15:
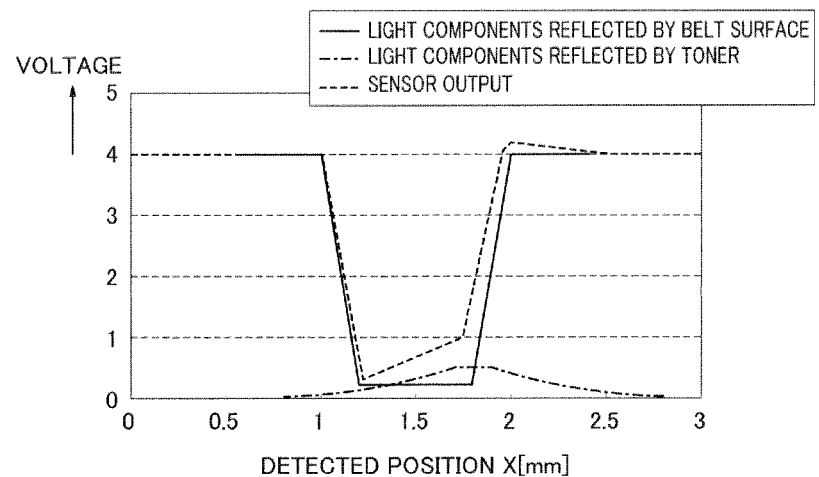
FIG. 15 is a graph showing the light components reflected by a belt surface and those reflected by a color toner when the irradiation area and the detection area are shifted in position as in FIG. 14.

In FIG. 14 the center of the irradiation area of the light emitting element and that of the detection area of the first light receiving element are shifted from each other. FIG. 15 shows the specular reflection of light components from the belt surface and the diffuse reflection of light components from the color toner when the centers of the irradiation area and the detection area are different as in FIG. 14.

The orientation characteristic of the LED is that it emits light at a largest intensity from the center of the irradiation area as in FIG. 10. The position at which the diffuse reflection of light from the color toner is maximal in amount does not coincide with the center of a decrease in the specular reflection of light from the belt surface (around X=1.5 in FIG. 15).

Figure 16:
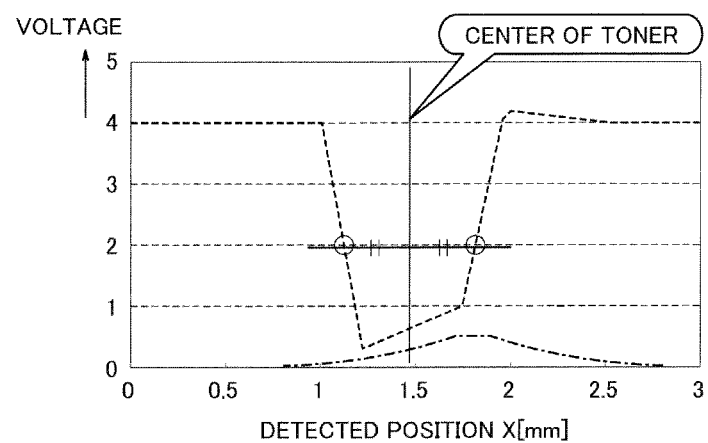
FIG. 16 is a graph showing how to find the image position of a correction pattern.

FIG. 16 shows how to detect a position shift. A threshold (for example, 2V in FIG. 16) is decided from the output signal of the first light receiving element 17Hs (sensor output) to find two points at which the output signal takes the threshold as the end points F1, F2 of the pattern image 29a in FIG. 3. The midpoints of the two end points F1, F2 are determined to be the detected positions X of the pattern image 29a.

Figure 17:
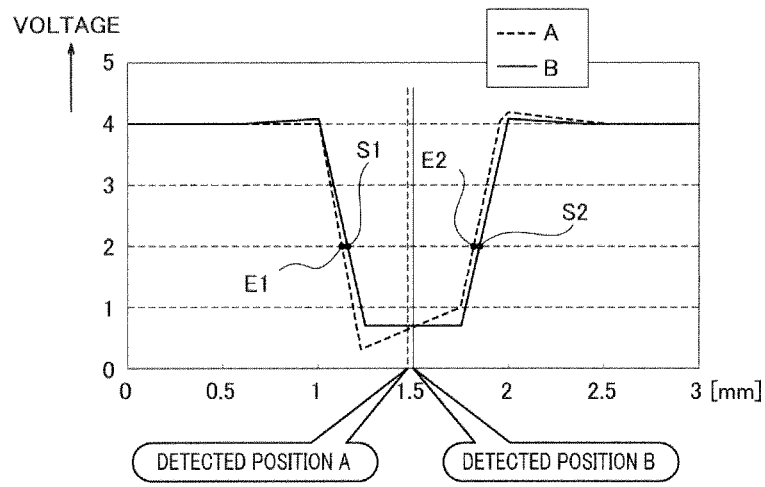
FIG. 17 shows different detected image positions with the sensor output A in FIG. 13 and that B in FIG. 15.

Referring to FIG. 17, a broken line A indicates the sensor output in FIG. 15 while a solid line B indicates the same in FIG. 13. Two points S1, S2 of the solid line B and two points E1, E2 of the broken line A at which the outputs take the threshold are different from each other so that detected positions will be changed accordingly.

Figure 18:
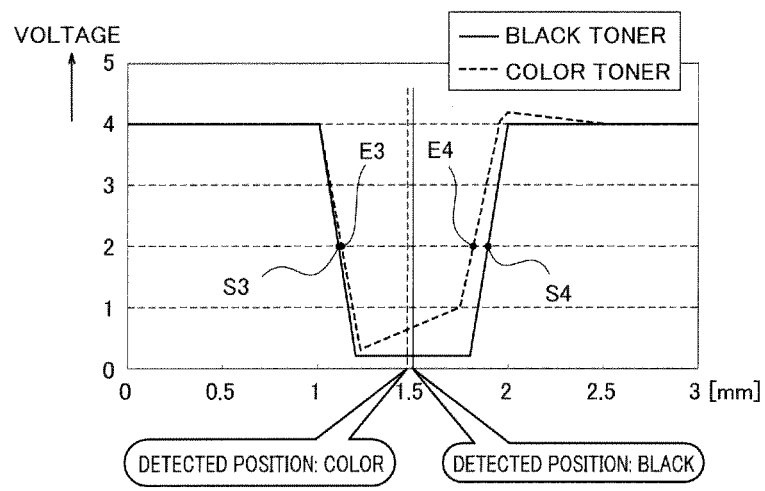
FIG. 18 is a graph showing the sensor outputs regarding color toner and black toner and their detected positions with the centers of the irradiation area and the detection area shifted.

FIG. 18 show the outputs of the TM sensor having detected light from the color and black toners and corresponding detected end positions when the centers of the detection area and irradiation area are shifted from each other in FIG. 14.

The detected end positions based on the light reflected from the color toner may differ. Shift amounts by the four colors are almost the same.

Meanwhile, the black toner does not cause diffuse reflection of light and a shift in detected positions. Therefore, two points S3, S4 at the threshold of 2V in FIG. 18 can accurately coincide with the actual end positions F3, F4 of the pattern image 29b. The position of the pattern image 29b can be accurately found. Similarly, the end positions and the position of the pattern image 29b' can be accurately found.

To the contrary, the color toner causes diffuse reflection of light and a shift in detected positions. Regarding the pattern images 29a, 29c, 29d, 29a', 29c', 29d', two points E3, E4 at the threshold of 2V in FIG. 18 do not coincide with the above two points S3, S4. That is, the points E3, E4 are shifted from the actual end positions so that the positions of the pattern images 29a, 29c, 29d and 29a', 29c, 29d' cannot be accurately found.

Next, a description is made on the operation of the image forming device 100 which can accurately acquire the end positions of the pattern images with no influence of the diffuse reflection of light and the shifted centers of the irradiation area and the detection area.

The controller 101 in FIG. 4 controls the exposing unit 11 and else in accordance with a manipulation of the operation unit to generate the correction pattern 29 on the intermediate transfer belt 5a. Then, the TM sensor 17 reads the correction pattern 29 to detect the shift amounts in the four color images referring to the positions of the pattern images 29b, 29b'.

First, the intermediate transfer belt 5a is irradiated with infrared beams from the light emitting element 17D. When the correction pattern 29 reaches the irradiation position of the light emitting element 17D along with the moving intermediate transfer belt 5a as shown in FIG. 2B, the first light receiving element 17Hs outputs the first light receiving signal G1 and the second light receiving element 17Hr outputs the second light receiving signal G2 in FIG. 6.

Figure 19:
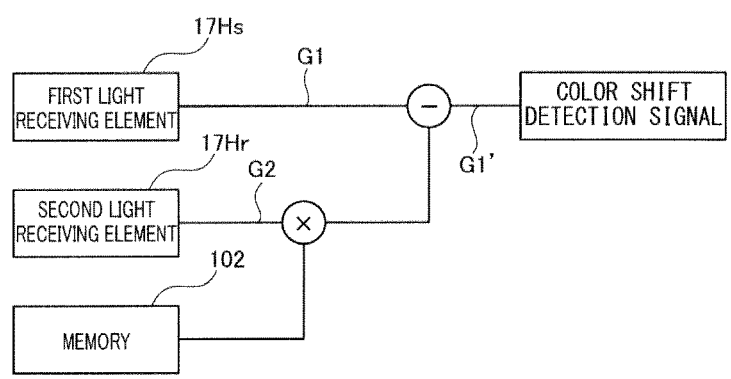
FIG. 19 is a block diagram of the structure of a controller.

In FIG. 19 the controller 101 corrects the first and second light receiving signals G1, G2 to the first light receiving signal G1' (color shift detection signal) having the diffuse reflection of light components removed in FIG. 7 by multiplying the value of the signal G2 by the coefficient of 0.3 and subtracting the multiplied value from the value of the first light receiving signal G1.

The controller 101 finds the two points at the threshold in FIG. 16 on the basis of the corrected first light receiving signal G1' to find the two end positions of each of the four color pattern images 29a to 29d and 29a' to 29d'.

Using the first light receiving signal G1' having the diffuse reflection of light components removed, the end positions of each pattern image can be accurately obtained. Accordingly, using the black toner images or pattern images 29b, 29b' as a reference, the positions of the color pattern images 29a, 29c, 29d, 29a', 29c', 29d' can be accurately found as well as a shift amount in each color patter image from a predetermined position. The controller 101 controls the exposing unit 11 to correct the image write timing and superimpose the four color images on one another without a color shift.

With the center of the detection area shifted from that of the irradiation area in FIG. 14, the first light receiving signal G1 of the first light receiving element 17Hs varies as in FIG. 16 while the second light receiving signal G2 of the second light receiving element 17Hr varies in proportion to the light components reflected by the toner in FIG. 15. Therefore, by correcting the first light receiving signal G1 by G1−G2*0.3, it is possible to obtain the graph of the light components reflected by the belt surface in FIG. 15.

Thus, according to the first embodiment it is possible to accurately acquire the positions of the pattern images 29a, 29c, 29d, 29a', 29c', 29d' from the reference pattern images 29b, 29b' as well as the shift amount thereof from a predetermined position with no influence of the diffuse reflection of light and the shifted centers of the irradiation area and the detection area. In addition, the coefficient (0.3) is stored in the memory so that it can be varied and set for the TM sensor 17.

Second Embodiment

The second embodiment is different from the first embodiment in that the coefficient α is determined and stored in the memory 102 instead of pre-stored.

Figure 20:
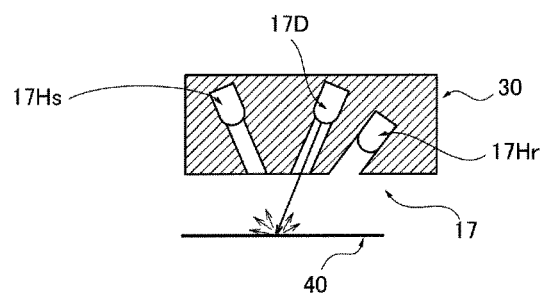
FIG. 20 shows the positional relation between the toner mark sensor and the diffuse rays from a color toner according to a second embodiment.

First, the light emitting element 17D of the TM sensor 17 emits infrared beams to a diffuse paper 40 such as a Mansell chart adhered on the intermediate transfer belt 5a as shown in FIG. 20, for example. Since the VSS is zero on the diffuse paper 40, the coefficient α is found by the following equation:

$$\alpha = VS/VD$$

That is, the controller 101 finds the coefficient α from the light receiving signals of the first and second light receiving elements 17Hs, 17Hr by the above equation and stores it in the memory 102.

Then, the diffuse paper 40 is removed from the intermediate transfer belt 5a, and the correction pattern 29 is generated and read with the TM sensor 17.

The controller 101 corrects the first light receiving signal G1 of the first light receiving element 17Hs in FIG. 19 to find the end positions and positions of the pattern images 29a to 29d and 29a' to 29d' as in the first embodiment. Thereby, it is possible to superimpose the four color images without a color shift.

The second embodiment can attain the same effects as those of the first embodiment. The coefficient α is found using the diffuse paper 40 so that it can be accurately set irrespective of an individual difference of the TM sensor 17.

Third Embodiment

Figure 21:
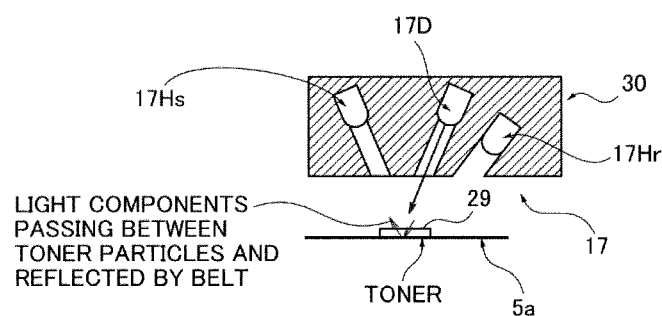
FIG. 21 shows the positional relation between the toner mark sensor and the diffuse rays from a color toner according to a third embodiment.

Another example of how to determine the coefficient α is described referring to FIG. 21. In the present embodiment, first, a sufficient amount of toner is attached onto the intermediate transfer belt 5a of the image forming device 100 as shown in FIG. 21. The light emitting element 17D emits infrared light beams to the toner. The amount of toner needs to be sufficient to prevent the light from transmitting between the toner particles, reflected by the belt surface, and reaching the first light receiving element 17Hs. Also, the area of the toner attachment has to be wider than the irradiation area of the light emitting element 17D.

The controller 101 then finds the coefficient α from the light receiving signals of the first and second light receiving elements 17Hs, 17Hr by the above equation, α=VS/VD and stores it in the memory 102.

Thereafter, it allows the cleaning unit 20 to remove the toner from the intermediate transfer belt 5a and operates as in the first embodiment.

The third embodiment can attain the same effects as those of the second embodiment. Besides, since the coefficient α is determined by using the toner, the steps of measuring the coefficient α in advance using the diffuse paper 40 and inputting the measured value to the image forming device 100 are omissible.

Fourth Embodiment

In the fourth embodiment the constant coefficient α is found from the light receiving signal of the first light receiving element 17Hs and stored in the memory 102.

Figure 22:
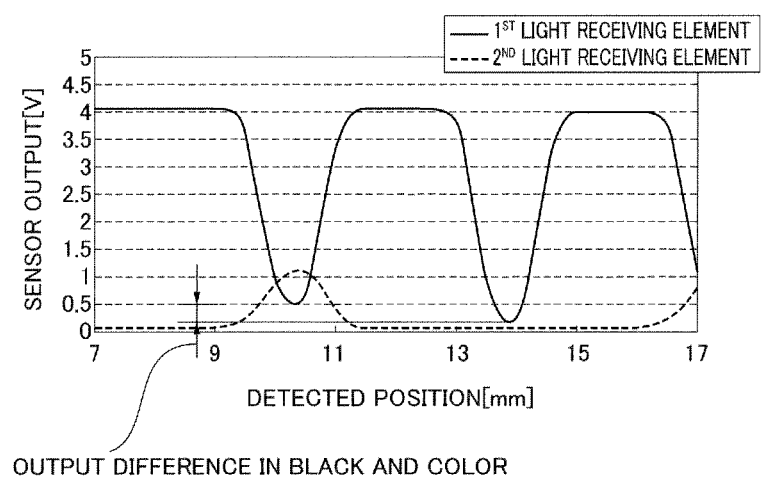
FIG. 22 is a graph showing the light receiving signals of the first and second light receiving elements according to a fourth embodiment when detecting the correction pattern.
Figure 23:
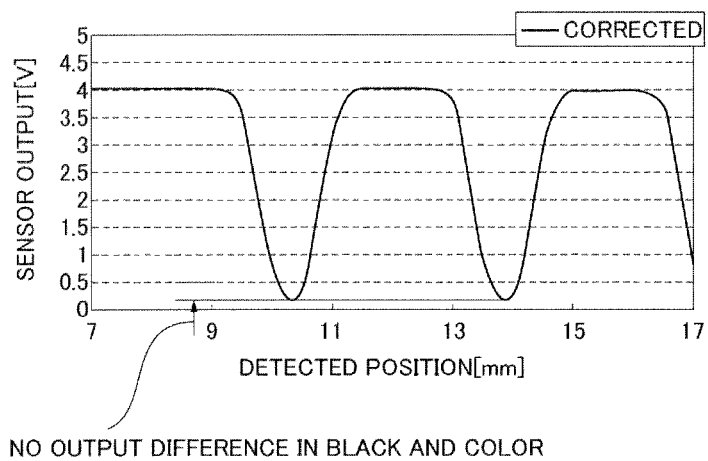
FIG. 23 shows the corrected light receiving signals of the light receiving elements in FIG. 22 with the same minimal value.

The correction pattern 29 is read with the TM sensor 17. As shown in FIG. 22, the output of the first light receiving element 17Hs exhibits different minimal values when receiving the light reflected from the black toner images or pattern images 29b, 29b' and from the color toner images or pattern images 29a, 29c, 29d, 29a', 29c', 29d'. The coefficient α is determined to make the minimal values coincide with each other as shown in FIG. 23.

Figure 24:
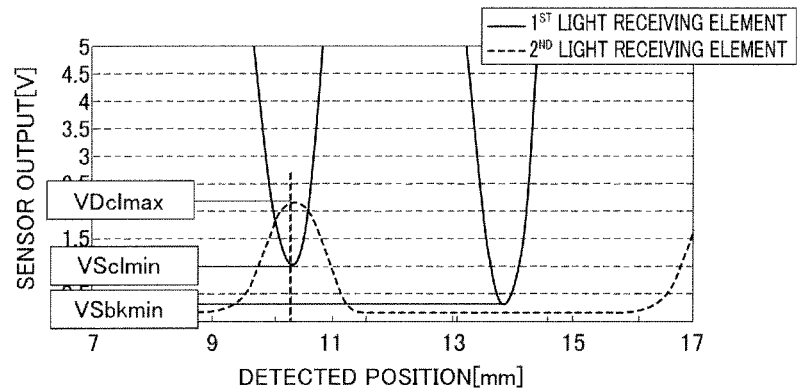
FIG. 24 is a graph showing how to find a constant coefficient.

Referring to FIG. 24, the coefficient α is found by:

$$\alpha=(VSc l\min-VSbk\min)/VDc l\max$$

where VSbkmin is the minimal value of the output signal of the first light receiving element 17Hs having detected a black color toner image, VSclmin is the minimal value of the output signal of the first light receiving element 17Hs having detected a cyan color toner image or pattern images 29a, 29a', and VDclmax is the output signal of the second light receiving element 17Hr when that of the first light receiving element 17Hs exhibits VSclmin.

The controller 101 finds the coefficient α by the above equation according to the light receiving signals of the first and second light receiving elements 17Hs, 17Hr and stores it in the memory 102. Then, it operates as in the first embodiment.

According to the fourth embodiment the coefficient α can be obtained using the correction pattern 29 without measuring the reflection of light in advance or using specific patterns. This can reduce the manufacturing cost of the position detector and image forming device and provide them with a lower price.

Fifth Embodiment

Figure 25:
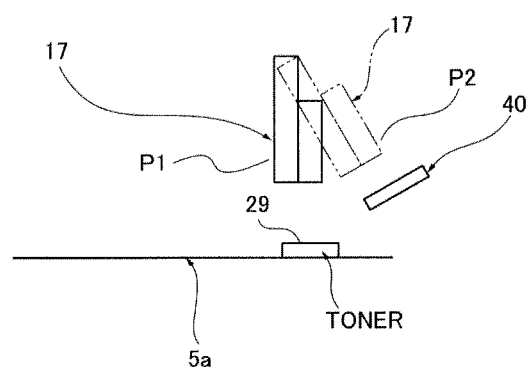
FIG. 25 shows a toner mark sensor according to a fifth embodiment.

FIG. 25 shows the toner mark sensor 17 according to a fifth embodiment. In the present embodiment the diffuse paper 40 is disposed in the body of the image forming device 100 and the TM sensor 17 is configured to be movable to a read position P1 and an escape position P2.

According to the fifth embodiment it is made possible to prevent the TM sensor 17 from be soiled with toner and else by moving the TM sensor 17 to the escape position P2 during non-use. In addition the coefficient α can be found from the equation, α=VS/VD by moving the TM sensor 17 to the escape position P2.

Moreover, a not-shown shutter can be provided between the TM sensor 17 and the intermediate transfer belt 5a instead of moving the TM sensor 17 to the escape position P2, to be closed during non-use of the TM sensor 17 and opened during use thereof. The coefficient α can be obtained by using the diffuse paper 40 adhered on a shutter surface.

In the present embodiment since the diffuse paper 40 is provided in the device body, it is unnecessary to input the coefficient α to the image forming device 100.

Sixth Embodiment

Figure 27:
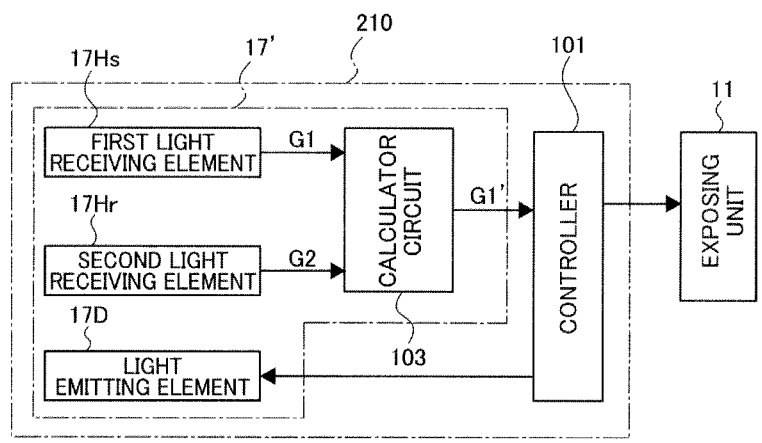
FIG. 27 is a block diagram of the structure of an image position detector according to a sixth embodiment.

FIG. 27 shows another image position detector 210 according to a sixth embodiment. The image position detector 210 includes a TM sensor 17' and the controller 101.

The TM sensor 17' includes the light emitting element 17D, first and second light receiving elements 17Hs, 17Hr, and a calculator circuit 103 as calculator. The calculator circuit 103 is incorporated in the case 30 in FIG. 2B and integrated with the light emitting element 17D and first and second light receiving elements 17Hs, Hr.

Figure 28:
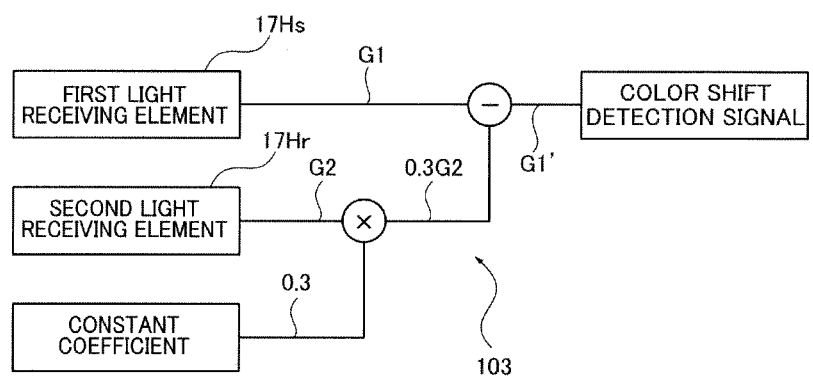
FIG. 28 shows the structure of a calculator circuit in FIG. 27.

In FIG. 28 the calculator circuit 103 is configured to multiply the value of the second light receiving signal G2 of the second light receiving element 17Hr by the constant coefficient of 0.3 and subtract the multiplied value from the value of the first light receiving element 17Hs to acquire a corrected first light receiving signal G1' (color shift detection signal) having diffuse reflection of light components removed as shown in FIG. 7. The constant coefficient of 0.3 is determined by a variable resistance or the like.

Figure 32:
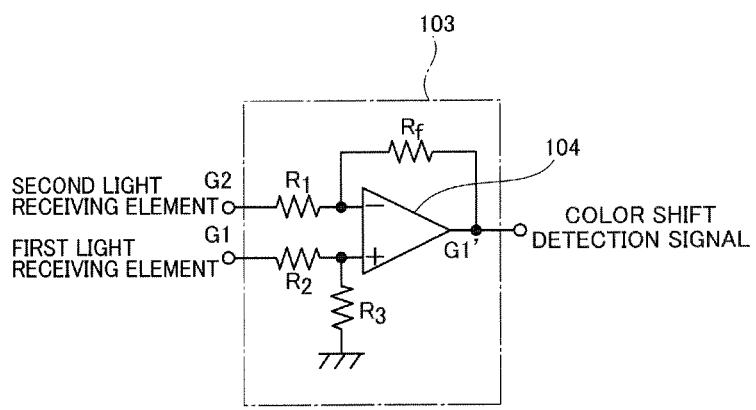
FIG. 32 shows the structure of a calculator circuit in FIG. 31.

An example of the calculator circuit 103 is shown in FIG. 32. It is comprised of an operation amplifier 104 and resistances R1 to R3, Rf. According to the calculator circuit 103, the corrected first light receiving signal G1' is obtained by:

$$G1'=G1(R1+Rf)/[R1(R2/R3+1)]-G2Rf/R1$$

The Rf/R1 is the coefficient and set to 0.3. (R1+Rf)/[R1(R2/R3+1)] is set to 1.

The coefficient can be changed arbitrarily by replacing the resistance Rf with a variable resistance.

As in the first embodiment, the controller 101 finds the two points at the threshold of 2V on the basis of the corrected first light receiving signal G1' to find the end positions of the four color pattern images 29a to 29d, 29a' to 29d' of the correction pattern 29.

Figure 29:
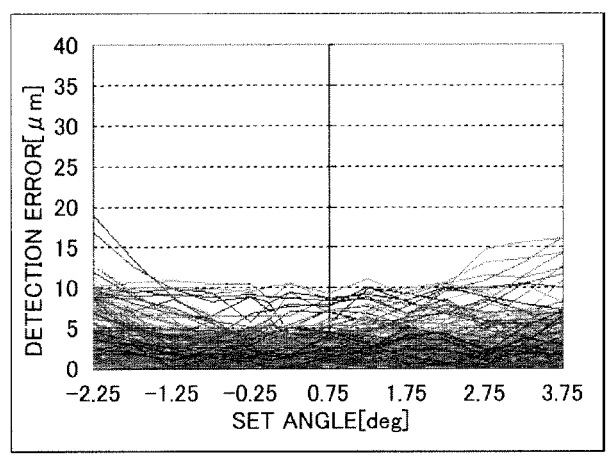
FIG. 29 shows detection errors with the influence of diffuse reflection of light removed.
Figure 30:
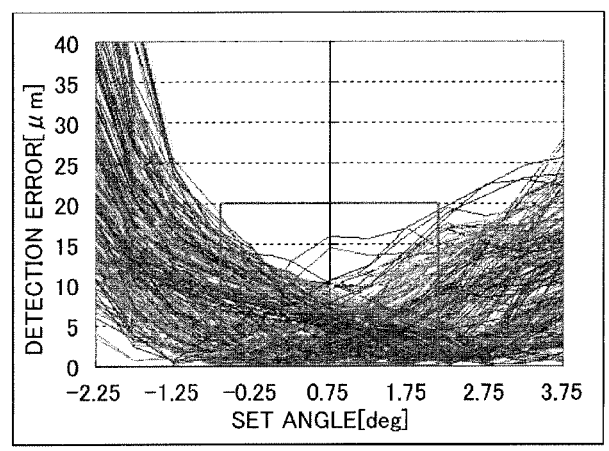
FIG. 30 shows detection errors with the influence of diffuse reflection of light not removed.

The graph in FIG. 29 shows a detection error in color shift with the influence of the diffuse reflection of light removed while that in FIG. 30 shows the same with the influence the diffuse reflection of light not removed. The vertical axis indicates detection error in color shift and the abscissa axis indicates set angle or tilt angle of the TM sensor 17.

As seen from FIGS. 29, 30, with the constant coefficient at 0.3, it is possible to decrease a detection error in color shift from 30 μm to 10 μm at ±1.5 degrees of the set angle of the TM sensor 17.

According to the sixth embodiment, incorporating the calculator circuit 103 in the TM sensor 17' and setting the resistance Rf in FIG. 32 to a variable resistance can facilitate the adjustment or optimization of the coefficient at the time when the TM sensor 17' is manufactured.

Seventh Embodiment

Figure 31:
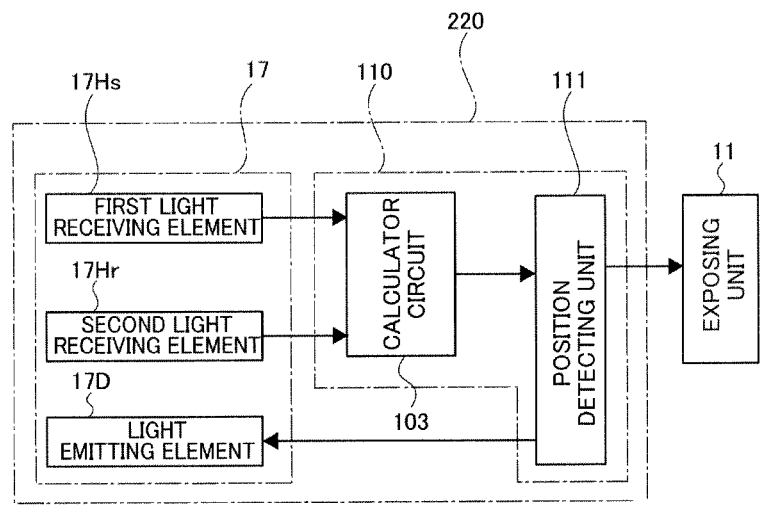
FIG. 31 is a block diagram of the structure of an image position detector according to a seventh embodiment.

FIG. 31 shows another image position detector 220 according to a seventh embodiment. It includes the TM sensor 17 and the controller 110.

The controller includes the calculator circuit 103 and a position detecting unit 111 to find the two end positions of the pattern images 29a to 29d, 29a' to 29d' on the basis of the first light receiving signal G1' corrected by the calculator circuit 103.

According to the seventh embodiment, incorporating the calculator circuit 103 in the controller 110 allows the use of an operation amplifier IC in which two or four operation amplifiers are integrated in a single package, resulting in downsizing the size of the device and reducing the manufacturing cost thereof.

As described above, the image position detector can accurately find the end positions of an image on the basis of a multiplied value obtained from multiplying the values of the first and second light receiving signals of the first and second light receiving elements by the constant coefficient, free from the influence of diffuse rays.

The above embodiments have described an example where the image position detector finds the two end positions of each of the pattern images 29a to 29d, 29a' to 29d' of the correction pattern 29. The present invention should not be limited to such an example. It can be applied to an image position detector to find the end positions of different color images.

It can be applied to measurement of the color aligning accuracy of color images in layers formed by attaching a powder or liquid in layers onto the surface of an object such as an image carrier which reflects light.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An image position detector to detect an end position of an image on an image carrier, comprising:
   a light emitting element to emit light to the image on the image carrier;
   a first light receiving element to receive a specular reflection of light from a surface of the image carrier and output a first light receiving signal; and
   a second light receiving element to receive a diffuse reflection of light from a surface of the image and output a second light receiving signal, wherein
   the image position detector is configured to find the end position of the image according to a multiplied value obtained by multiplying values of the first and second light receiving signals by a constant coefficient.

2. An image position detector according to claim 1, further comprising
   a calculator to subtract the multiplied value from the value of the first light receiving signal to correct the first light receiving signal, and find the image end position according to the corrected first light receiving signal.

3. An image position detector according to claim 1, further comprising
   a memory in which the constant coefficient is stored.

4. An image position detector according to claim 3, wherein:
   the light emitting element emits the light to a diffuse plate;
   the first and second light receiving elements are configured to receive the light reflected by the diffuse plate and output the first and second light receiving signals; and
   the constant coefficient is found according to a ratio of values of the output first and second light receiving signals.

5. An image forming device comprising:
   the image position detector according to claim 4; and
   the diffuse plate in a device body 6. An image position detector according to claim 3, wherein:
   the image is formed on the image carrier by attaching, onto the image carrier, an amount of powder enough to remove an influence of the diffuse reflection of light on a belt surface;
   the light emitting element emits the light to the attached powder;
   the first and second light receiving elements are configured to receive the diffuse reflection of light from the attached powder and output the first and second light receiving signals, respectively; and
   the constant coefficient is found according to a ratio of values of the output first and second light receiving signals.

7. An image position detector according to claim 3, wherein:
   the image is a color pattern image for correction;
   the first light receiving element is configured to output the first light receiving signal of a first minimal value, upon detecting a black toner image of the color pattern image, and output the first light receiving signal of a second minimal value, upon detecting a color toner image of the color pattern image;
   the second light receiving element is configured to output the second light receiving signal when the second minimal value is detected; and
   the constant coefficient is found according to the first and second minimal values and a value of the output second light receiving signal.

8. An image forming device comprising the image position detector according to claim 1.

9. An image position detector to detect an end position of an image on an image carrier, comprising:
   an optical sensor comprising
   a light emitting element to emit light to the image on the image carrier,
   a first light receiving element to receive a specular reflection of light from a surface of the image carrier and output a first light receiving signal,
   a second light receiving element to receive a diffuse reflection of light from a surface of the image and output a second light receiving signal, and
   a calculator to multiply values of the first and second light receiving signals by a certain coefficient and subtract the multiplied value from the value of the first light receiving signal to correct the first light receiving signal, and find the image end position according to the corrected first light receiving signal; and
   a controller to find the end position of the image according to the corrected first light receiving signal by the calculator.

10. An image position detector according to claim 9, wherein:
    the calculator is included in the controller instead of the optical sensor;
    the controller comprises a position detecting unit to find the end position of the image according to the corrected first light receiving signal by the calculator.

11. An image position detector according to claim 9, wherein
    the certain coefficient is a preset, constant value.

12. An image position detector according to claim 9, wherein
    the certain coefficient is variable.

* * * * *